United States Patent [19]
Percich

[11] 3,716,225
[45] Feb. 13, 1973

[54] HOSE STRAIGHTENING FIXTURE
[75] Inventor: Phillip P. Percich, Worthington, Ohio
[73] Assignee: Amerace Esna Corporation, New York, N.Y.
[22] Filed: Feb. 22, 1971
[21] Appl. No.: 117,483

[52] U.S. Cl. ..................................269/269, 29/200 P
[51] Int. Cl. ...............................................B25b 1/24
[58] Field of Search...29/200 R, 200 B, 200 J, 200 P, 29/235; 269/265–269

[56] References Cited

UNITED STATES PATENTS 3,561,750   2/1971   Woodrum ............................269/269
3,579,786   5/1971   Johnson .............................29/200 P Primary Examiner—Robert C. Riordon
Assistant Examiner—Neil Abrams
Attorney—Kane, Dalsimer, Kane, Sullivan & Kurucz

[57] ABSTRACT

A fixture for holding curved rubber hose so that the ends thereof are substantially aligned comprising a pair of spaced members each of which is formed in the vertical plane in the configuration of an arc with said members having the same axis and a third member which is also arcuate in the vertical plane and which in the horizontal plane is in the configuration of a wedge, said third member being relatively movable toward and away from said spaced members whereby the point of the wedge can intercept the axis of the spaced members and press against a hose outside curvature to reverse the curvature of the hose.

5 Claims, 6 Drawing Figures

PATENTED FEB 13 1973 3,716,225

INVENTOR
PHILIP P. PERCICH
BY
ATTORNEYS

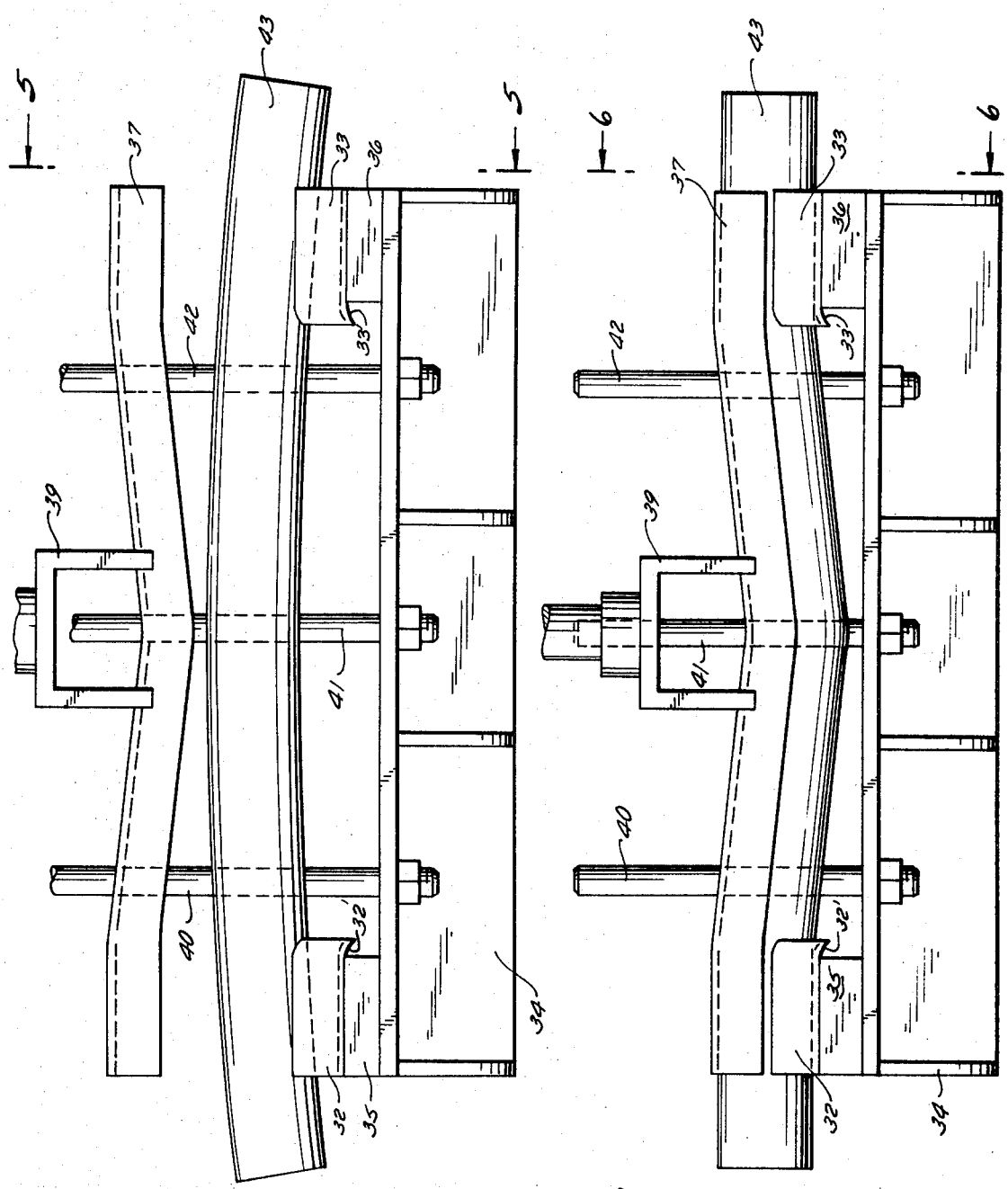

HOSE STRAIGHTENING FIXTURE

BACKGROUND OF THE INVENTION

In coupling train cars together a short piece of hose is used having coupling members at either end thereof. In the art, one of these coupling members is called a "glad hand" and the other is identified as a "short shank" coupling. Historically the hose member was straight. However, it was found that a hose member of arcuate or curved configuration would be superior since the arcuate shape would prevent the free end from dragging on the ground when the car was not coupled to another, and also the arcuate form would allow easier coupling of the free end.

In use, the hose wears out, however, the glad hand and short shank coupling members do not. The railroad maintenance men would, upon determining by inspection that a hose had reached the condition where it was no longer useful, remove the coupling members and apply these to another hose. The common practice was to push the glad hand and short shank coupling members into the hose ends by force of cylinders applied axially one against the other. Difficulty was therefore encountered in maintenance shops in fitting the glad hand and short shank coupling to the arcuate tube. With the curved hose it was impossible to press the coupling members into the ends by application of force applied axially at each end. The hose being very rigid, it was found impossible to straighten it out.

A fixture for holding curved rubber hose in a substantially straight condition was developed. This fixture had first and second facing arcuate pipe members, the second pipe member being movable toward and away from the first pipe member, and a plurality of spaced knob members projecting from the movable pipe member in the direction of the rigid pipe member so that in use the knobs could press against the outside curvature of a hose in the fixture to reduce the distance of the same to the inside curvature. This prior art device is disclosed and claimed in U.S. Pat. No. 3,561,750.

While the hose straightening fixture which is the subject of U.S. Pat. No. 3,561,750 solved many problems and represented an important step in the art, it has been found that an improved hose straightening fixture such as that disclosed herein is superior and more desirable than that disclosed heretofore for reasons which will appear below.

SUMMARY OF THE INVENTION

A device for holding curved rubber tubing so that the ends thereof are substantially aligned including a pair of spaced members having arcuate surfaces formed on a single axis, a third member having an arcuate surface in facing relationship with the arcuate surfaces of said spaced members, said third member being relatively movable toward and away from said spaced members and wedge shaped in the plane of the axis of said spaced members whereby the point of the wedge can press against the curved outer surface of said tubing to reverse the direction of curvature thereof.

DESCRIPTION OF THE DRAWINGS

In the drawings:

FIG. 3 is a plan view of the fixture shown in FIG. 2 in open condition;

FIG. 4 is a view similar to that of FIG. 3 but with the fixture shown in closed condition;

DESCRIPTION OF THE INVENTION

Figure 1:
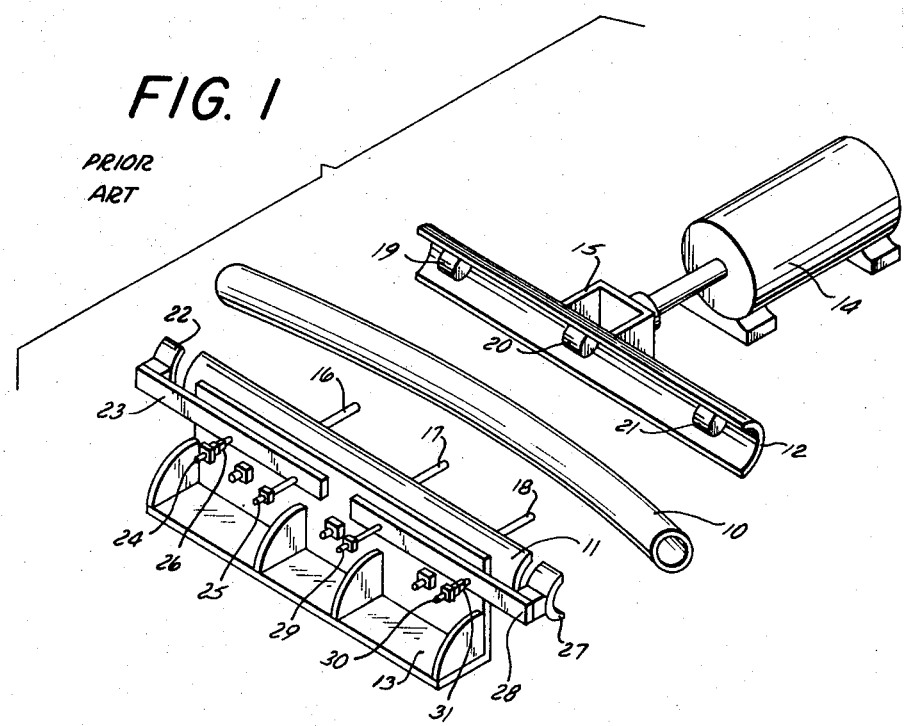
FIG. 1 is an exploded perspective view of a prior art device for holding the rubber tubing while the coupling members are affixed thereto.
Figure 2:
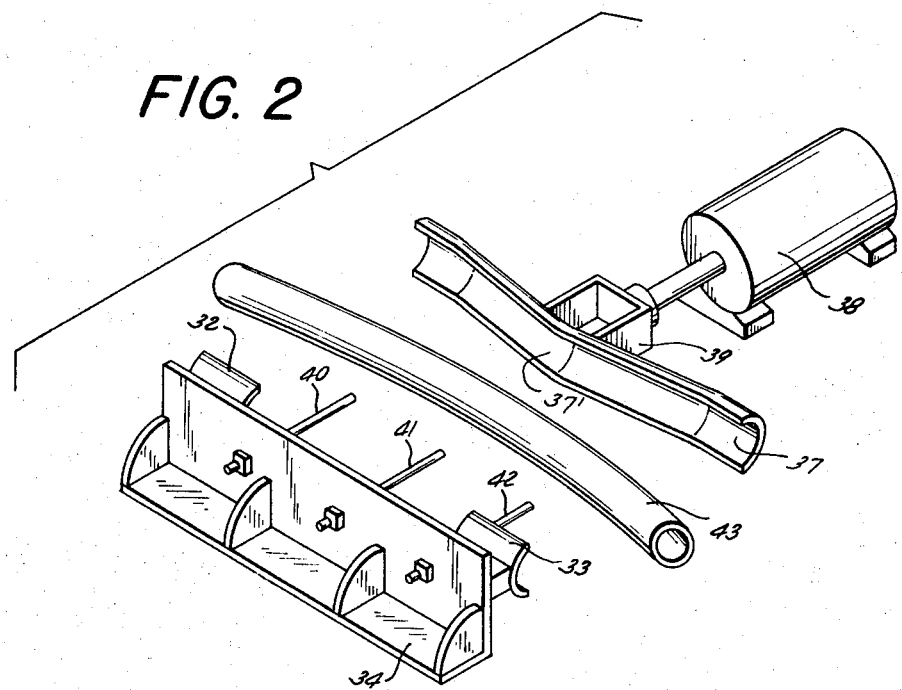
FIG. 2 is an exploded perspective view of a fixture constructed in accordance with the teachings of this invention.
Figure 5:
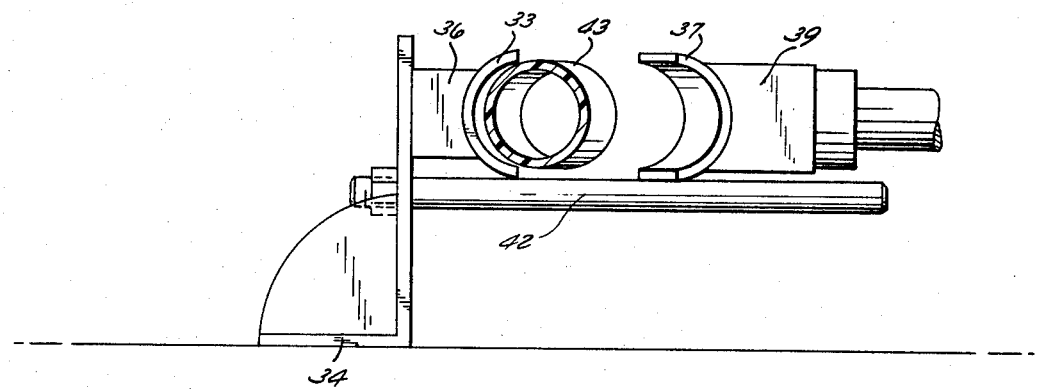
FIG. 5 is a sectional view taken along the line 5—5 in the direction of the arrow in FIG. 3.
Figure 6:
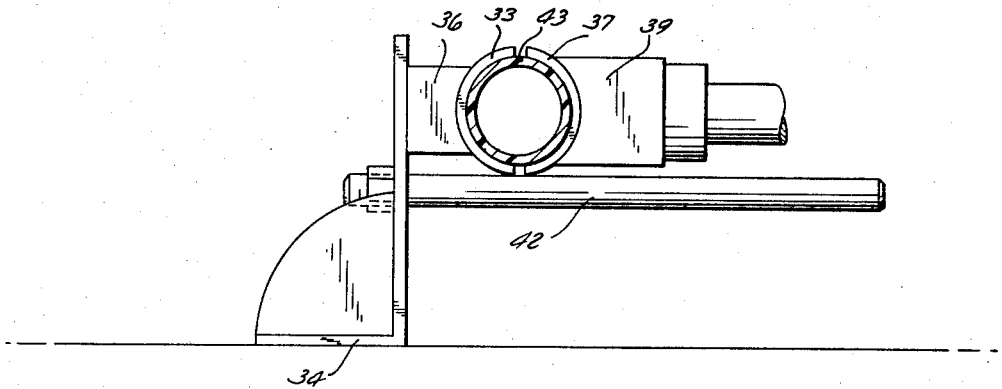
FIG. 6 is a sectional view taken along the line 6—6 in the direction of the arrow in FIG. 4.

In FIG. 1 a prior art fixture of the type used in affixing the coupling members to the end of a straight hose is shown. Hose 10 is to be held in position by arcuate pipe members 11 and 12. Pipe member 11 is supported in a stationary position by support means 13 and pipe member 12 is supported by clamping cylinder 14 to which it is connected by means of bracket 15. Cylinder 14 is constructed and arranged to move the pipe member 12 toward and away from pipe member 11 to enable the clamping of hose 10 thereby. This cylinder can be pneumatic, hydraulic, or any combination or variation which is well known in the art.

Guide means in the form of three rods 16, 17 and 18 project from the first support means 13 beneath pipe members 11 and 12.

Cylindrical knobs 19, 20 and 21 project from the arcuate surface of pipe member 12 toward the arcuate face surface of pipe member 11. The knobs 19, 20 and 21 which have the same axis are spaced one from another and do not extend to touch arcuate surface of pipe member 11 in the closed condition of the fixture.

The pipe member 11 is provided at either end with an arcuate section referred to as a helper which is spaced from the pipe member 11.

Helper 22 is supported by bracket 23 mounted on rods 24 and 25 projecting from the support means 13. A spring 26 is mounted on rod 24 to yieldingly urge helper 22 forwardly. Likewise, helper 27 is supported by bracket 28 mounted on rods 29 and 30 with spring 31 yieldingly urging the helper 27 forwardly.

The hose in this fixture in order to allow the couplings to be pushed in both ends at the same time, the distance over the outside curvature has to be reduced to the same distance as the inside curvature. To accomplish this, the straight-line distance is disrupted and spread over hills and valleys. This pulls the outside curvature of the hose into a shorter distance and, in effect, straightens the hose. This is what the fixture with the three cylindrical knobs 19, 20 and 21 on the inside or face of pipe member 12 will accomplish. The helpers on the stationery half of the fixture help to pull the ends in alignment and make a more positive alignment in a shorter period of time.

In use, the hose is placed in the fixture and the clamping cylinder actuated to bring pipe member 12 toward pipe member 11 with the guide means 16, 17 and 18 maintaining the proper alignment. The helpers push the hose ends into position and the knobs distort the hose in order to provide a substantially straight hose within the fixture. After this has occurred, the coupling members can be forced into the ends of the tube by cylinders applying axial force.

It is necessary that the ends of the hose protrude out beyond the fixtures so that the hose can expand at the ends when the glad hand and coupling are inserted therein. The hose ends have a tendency to curve so that the ends are not in a straight line with the shank of the glad hand or coupling. The helper members attempt to correct this situation and accomplish this on the side of the hose against which it is applied, however the hose tip away from the helper members can still have curvature so that on occasion the hose end collapses rather than receive the insertion of glad hand or coupling. Accordingly the fixture disclosed in FIGS. 2 through 6 has been developed.

The device illustrated in FIGS. 2 – 6 includes a pair of spaced arcuate pipe members 32 and 33 having the same axis for their arcuate surfaces, and first support means 34. Each of the pipe members are attached to support means 34 by a respective bracket 35 or 36.

A third pipe member 37 having an arcuate surface in facing relationship with the arcuate surface of the spaced members 32 and 33 is supported by clamping cylinder 38 by coupling bracket 39. This support is constructed and arranged to move the pipe member 37 toward and away from members 32 and 33. The clamping cylinder can be pneumatic, hydraulic or any combination or variation known in the art.

Guide means in the form of rods 40, 41 and 42 project from the first support means 34 beneath the pipe members. The lowermost edge of each of the pipe member 37 touches the rods.

The third member 37 is wedge shaped in the direction of its movement so that upon being moved toward the members 32 and 33, in the plane of their axis, the wedge point 37' can intercept the axis of members 32 and 33. It is noted that each of the members 32 and 33 is provided with an inboard lip designated by the numerals 32' and 33' respectively to allow movement of the center portion of hose 43 and alignment of the ends thereof.

In use, the house is placed in the fixture and the clamping cylinder actuated to bring pipe member 37 toward pipe members 32 and 33. The guide means 40, 41 and 42 are useful in maintaining the proper alignment, although under certain circumstances the guide members may not be necessary. The wedge point 37' strikes the curved outer surface of the hose pressing the central portion of the hose inwardly between the positions shown in FIGS. 3 and 4 wherein the position as illustrated in FIG. 4 the ends of the hose are aligned and the coupling members can be forced into hose ends.

It is noted that in the position of the hose shown in FIG. 3 the hose ends are aligned on the same axis which is the axis of members 32 and 33 and that the center axis of the hose in the center has crossed through and passed the axis of members 32 and 33.

Thus it is seen that with the device shown herein coupling members can be applied to curved hose in maintenance shop work in substantially the same manner as they had been applied to straight hosing.

I claim:

1. A device for holding curved tubing so that the ends thereof are substantially aligned including a pair of spaced members, respective first and second arcuate surfaces of said spaced members having a single axis, a third member, third and fourth arcuate surfaces of said third member in facing relationship respectively with said first and second arcuate surfaces, said third member being relatively movable toward and away from said spaced members and wedge shaped between said third and fourth arcuate surfaces in the plane of the axis of said spaced members whereby the point of the wedge can press against the curved outer surface of said tubing to reverse the direction of curvature thereof while the ends thereof are maintained in alignment by said arcuate surfaces.

2. A device for holding curved tubing in accordance with claim 1 in which the point of the wedge of said third member is equidistant at all times from each of said spaced members.

3. A device for holding curved tubing in accordance with claim 2 in which each of said spaced members is provided with an inboard lip to allow movement of the hose.

4. A device for holding curved tubing in accordance with claim 2 so that in the aligned condition of the tube ends the axis thereof is the axis of said spaced members and the center axis of the tube has crossed through and passed the axis of said spaced members.

5. A device for holding tubing in accordance with claim 2 in which a plurality of guide means are provided beneath said members for maintaining the alignment of said members during movement thereof.

* * * * *